United States Patent
Moody et al.

[15] 3,670,011
[45] June 13, 1972

[54] ACETOACETATE OF 2-HYDROXYMETHYL-5-NORBORNENE

[72] Inventors: Anthony Gifford Moody; Robert Owen Symcox, both of Runcorn, England

[73] Assignee: Imperial Chemical Industries Limited, London, England

[22] Filed: March 27, 1970

[21] Appl. No.: 22,688

Related U.S. Application Data

[62] Division of Ser. No. 663,546, Aug. 28, 1967, Pat. No. 3,520,843.

[30] Foreign Application Priority Data

Sept. 5, 1966 Great Britain..................39,583/66

[52] U.S. Cl. ................260/483, 260/29.6 R, 260/29.6 T, 260/31.8 R, 260/32.8 R, 260/33.6 UA, 260/33.8 UA, 260/66, 260/85.7, 260/86.1 R, 260/87.7, 260/617 F

[51] Int. Cl. .......................................C07c 69/72

[58] Field of Search...................................260/483

[56] References Cited

UNITED STATES PATENTS

2,425,173  8/1947  Bruson.................................260/476
3,392,190  7/1968  Dissen.................................260/483

OTHER PUBLICATIONS

Chem. Abstracts, 65: 15175g.
Chemical Abstracts, 52: 12775h.
Chemical Abstracts, 52: 12776a.
Chemical Abstracts, 54: 3272c.
Chemical Abstracts, 64: 8404g.
Chemical Abstracts, 65: 12291f.

*Primary Examiner*—Lorraine A. Weinberger
*Assistant Examiner*—Vivian Garner
*Attorney*—Cushman, Darby & Cushman

EXEMPLARY CLAIM

1. The acetoacetate of 2-hydroxymethyl-5-norbornene.

1 Claim, No Drawings

ACETOACETATE OF 2-HYDROXYMETHYL-5-NORBORNENE

This is a division of our copending application, Serial No. 663,546, filed Aug. 28, 1967, now U.S. Pat. No. 3,520,843.

The present invention relates to hardenable compositions wherein the principal components are copolymers having enolizable keto groups and reactive compounds of chelatable metals. It also relates to novel copolymers for use in the preparation of such compositions and to novel comonomers for use in the production of these copolymers.

Many attempts have been made hitherto to produce hardenable polymer compositions based on mixtures of polymers containing chelating groups with compounds of metals which are capable of forming chelates but none of these has ever achieved commercial success. One of the contributory factors to this lack of success is the difficulty of finding a readily polymerizable monomer which contains chelating groups and yet is neither too expensive nor a strong chain transfer agent in polymerization reactions. In particular, it is desirable for the monomer to be copolymerizable with a wide variety of vinyl monomers (as hereinafter defined) including vinyl acetate so that copolymers with a wide variation of physical properties may be obtained.

In accordance with our invention we have now found a monomer which contains chelating groups, is capable of copolymerizing with a wide range of vinyl monomers including vinyl acetate, is synthesizable from cheap and readily available materials, and exhibits little or no chain transfer activity during copolymerization with vinyl monomers. This monomer is the acetoacetate of 2-hydroxymethyl-5-norborene Its keto form, for example, has the structure:

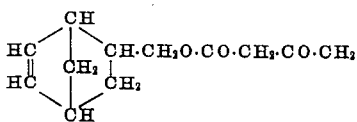

As a further embodiment of our invention we provide copolymers of this monomer with vinyl monomers as hereinafter defined and as yet another embodiment we provide hardenable compositions comprising (i) said copolymers and (ii) reactive compounds (as hereinafter defined) of metals (which term, for present purposes, includes boron) which are polyvalent and capable of forming chelates.

Preferably, the hardenable compositions contain the copolymer in the form of a solution or dispersion, thereby providing easily handled fluid materials from which films and coatings may be derived by conventional means.

The acetoacetate of 2-hydroxymethyl-5-norborene, hereinafter referred to as the chelating monomer for convenience, may be prepared in high yield from 2-hydroxymethyl-5-norborene.

2-hydroxymethyl-5-norborene may be prepared without the need for difficult techniques or complex apparatus by Diels-Adler reaction between allyl alcohol and cyclopentadiene, both of which are compounds which are readily available as byproducts in the petroleum and heavy chemical industries. Yields of the same order as from the use of these two starting materials may also be obtained by reacting the allyl alcohol with a crude hydrocarbon stream containing the cyclic diene (i.e., an appropriate cracked naphtha fraction) without the need for first separating the cyclic diene.

To obtain the chelating monomer, the hydroxy compound may be reacted with acetoacetic acid or a functional derivative thereof. By a functional derivative, we mean a derivative that may react with an alcoholic hydroxyl group to yield the corresponding acetoacetate, for example, an ester or anhydride of acetoacetic acid.

Diketone is a particularly preferred functional derivative of acetoacetic acid because it is readily available as a product of cracking acetone or acetic anhydride and because its reaction with a hydroxyl group, being an addition reaction rather than a condensation reaction, does not involve byproduct formation.

Known methods of reacting acetoacetic acid or its functional derivatives with alcoholic hydroxyl groups may be used in the production of the chelating monomer. For example, in the case of the use of diketene, the reaction is conveniently effected at moderate temperatures in solution in an organic solvent and in the presence of a tertiary amine, e.g., triethylamine, and a polymerization inhibitor, e.g., sulphur or t-butyl catechol; see for example, Bull. Soc. Chem. Bolg. 63, (1954) page 419. Preferably the diketene is slowly added to a heated mixture of the 2-hydroxymethyl-5-norbornene and tertiary amine, preferably at about 60° to 90° C. No advantage appears to be gained in using temperatures above 100° C. and in fact such conditions may favour diketene oligomerization to the detriment of acetoacetate formation.

The product may be isolated in high yield by distillation under reduced pressure. It is a viscous, clear, very pale lime green or colorless liquid boiling at 137°–140° C at an absolute pressure of 1.9 mm. of mercury. It is miscible with most common solvents and readily copolymerizable with vinyl monomers in general by free-radical initiated polymerization.

By vinyl monomers, we mean monomers which contain ethylenic carbon-carbon unsaturation and are polymerizable and/or copolymerizable by free radicals. Examples are ethylene and its derivatives, e.g., vinyl esters, vinyl halides, vinylidene halides, aralkenes and $\alpha$, $\beta$-ethylenically unsaturated carboxylic acids and derivatives thereof. Particular examples are vinyl acetate, vinyl chloride, vinyl bromide, vinylidene chloride, styrene, ethyl acrylate, 2-ethyl hexyl acrylate, methyl methacrylate, acrylonitrile and methacrylonitrile.

In the preparation of the copolymers, the vinyl monomers may be used singly or in combination and, if desired, in admixture with other ethylenically unsaturated materials copolymerizable therewith. However, we have found that for use in the hardenable compositions of our invention the copolymers of methyl methacrylate are much preferred because of the gloss, hardness and chemical resistance they impart to hardened films obtained therefrom.

The copolymers may be prepared by free-radical initiated polymerization of mixtures of one or more vinyl monomers and our chelating monomer. Polymerization may be effected, for example, with the monomers in solution in a suitable solvent or in suspension in a non-solvent therefor, e.g., water. Alternatively, polymerization may be effected in the absence of any such diluent. Polymerization conditions that are normally used in the art of polymerizing vinyl monomers by free-radical processes may be used. The products are generally derived in the form of solutions or dispersions in suitable liquids and separation of the copolymers from the polymerization media and re-dispersion or solution in appropriate dispersion media or solvents may be required when fluid coating compositions are desired. Preferred dispersion media and solvents are volatile cheap liquids, e.g., water, petroleum, ethyl acetate, methyl ethyl ketone, acetone and chloroform.

In addition to the method of preparation just described, these copolymers may also be prepared by an alternative method which comprises first copolymerizing the vinyl monomer with 2-hydroxymethyl-5-norbornene and thereafter reacting the copolymer so obtained with the acetoacetic acid or functional derivative thereof. This method, however, is generally less favored because of the uncertainty as regards final composition.

The copolymers formed as described above may be combined, preferably in solution or dispersion form, with reactive compounds of polyvalent chelatable metals to form the hardenable compositions of our invention.

Examples of polyvalent chelatable metals are aluminum, cobalt, nickel, zinc, magnesium, zirconium, beryllium, titanium, copper, manganese, iron, chromium, cadmium, boron, tin, scandium, vanadium and bismuth.

The choice of metal will depend upon whether extensive cross-linking is desired (when metals with high valencies will be chosen), upon whether coloration of the products is acceptable, and upon whether toxicity can be tolerated. In general, zinc, magnesium, zirconium, beryllium and aluminum give uncolored products; compounds of aluminum and zirconium being notable for their ready reaction and availability. Titanium is a useful metal of high valence and may conveniently be used in the form of its liquid alkoxides although it tends to cause yellowing if heat is applied to cause hardening and therefore it may not be desirable to use it in stoving compositions.

By a reactive compound of the metal we mean one which will react with enolizable keto groups to yield products in which the metal atom forms part of a chelate ring. Such compounds are commonly alkyls, aryls, alkoxides, aryloxides and chelates: for example, ethyls, isomeric propyls, butyls, acyls and hexyls; ethoxides, isopropoxides and butoxides; and chelates with, for example, acetylacetone, acetoacetic acid, ethylacetoacetate, butyl acetoacetate, salicylic acid, methyl salicylate and salicylaldehyde. In the case of the chelates, hardening appears to be a a transchelation reaction with the evolution of, e.g., acetylacetone. In the case of the alkyls and alkoxides, alkane or alcohol appears to be liberated during the hardening reaction.

Particular examples of metal compounds that may be used are aluminum triethyl, aluminum tri(n-hexyl), aluminum tri(isobutyl), aluminum tri(isopropoxide), aluminum tris(ethyl acetoacetate), aluminum tris(acetylacetonate), zinc bis-(ethylacetonacetate), zinc bis(acetylacetonato) and similar derivations of magnesium, beryllium, copper, cobalt, titanium, iron and zirconium.

As a general rule, the alkyls and alkoxides tend to be more reactive than the chelates and may need to be used with care if premature gelation, e.g., during mixing with the copolymer, is to be avoided. On the other hand, the chelates generally require the application of heat to achieve the maximum degree of hardening although in many cases some degree of hardening can be achieved at room temperature with the passage of time. An intermediate degree of activity may be attained, however, by using a compound which is part alkoxide, part chelate, e.g., as in aluminum bis(ethyl acetoacetate monoethoxide or monoisopropoxide and titanium bis(ethyl acetoacetate)dibutoxide. Alternatively, a metal alkoxide is chemically uncombined admixture with a chelating compound, e.g., acetylacetone, may be used. With these systems, in general more rapid cross-linking and/or a higher degree of cross-linking may be achieved at room temperature than in the case of the chelates but it is often found that heat is required to achieve optimum results.

Where water is present in the hardenable composition, e.g., as the diluent, it is preferable to avoid the use of metal compounds containing alkyl and/or alkoxide groups because of their reactivity with it. In such a composition, it is preferable also to use a metal compound which is water-soluble. An example is the product of reacting one mole of butyl titanate with three moles of triethanolamine. However, in the case where a plasticizer for the polymer is also present, a metal compound which is soluble in the plasticizer may be used, if desired.

Where possible, the use of metal alkyls is generally avoided because of their inflammability.

To obtain hardenable films and coatings having the most desirable properties it is preferred to use copolymers obtained from monomer mixtures containing from 0.5 to 10, and generally from 1 to 5, mole percent of our chelating monomer but the amount of cross-linking that can be achieved is dependent not only upon the concentration of enolizable groups in the copolymer but also upon the amount of metal compound that is used. In general, it is uneconomical to use more of the metal compound than that required to react with all the enolisable groups in the copolymer and often the use of considerably less than the stoichiometric amount is adequate. In general, the compositions will contain from 0.5 to 15 percent of metal compound, based on the weight of copolymer, and preferably from 3 to 10 percent.

As has been stated above, the copolymers of methyl methacrylate are especially preferred. Preferably, however, these are plasticized in order to obtain an adequate degree of toughness in the hardened films and coatings. Plasticization may be activated by the addition of an external plasticizer and/or by the incorporation in the copolymer chains of repeating units derived from, e.g., an alkyl acrylate. Examples of external plasticizers are the diesters of phthalic acid known for this purpose, e.g., dioctyl phthalate, diisobutyl phthalate and butyl benzyl phthalate. These are preferably used in amounts of from 5 to 100 percent by weight of polymer. Examples of alkyl acrylates that may be used to modify the copolymer are methyl acrylate, ethyl acrylate and 2-ethyl hexyl acrylate. In general it is desirable that they form from 5 to 70 percent by weight of the polymerizable mixture.

The manner of mixing the copolymers and polyvalent metal compounds together to form our hardenable compositions is not critical. In general, however, to form fluid compositions suitable for conversion to films and coatings it has been found convenient to add the metal compound, or a solution thereof in a suitable solvent, to a solution or dispersion of the copolymer. In general, it is preferred that the resultant fluid mixture contains the solvent or diluent in overall concentrations of from 1,000 to 10 percent by weight of the copolymer. Stirring is desirable to achieve good mixing.

Depending on the choice of copolymer, the nature of the diluent and the nature of the polyvalent metal compound, compositions may be obtained from which films and coatings may be deposited which harden at room temperature. Others may require the application of heat. Some compositions of our invention not only provide room temperature-hardenable films and coatings but are also can-stable; that is, capable of being stored in sealed containers for long periods of time without gelling prematurely. In general, such compositions may be obtained either by mixing the copolymer with a metal alkoxide in the presence of an enolizable β-keto compound, e.g., acetylacetone or ethyl acetoacetene or by mixing it with a metal compound containing both alkoxide and chelate groups. The further addition of a volatile chelating agent, e.g., acetylacetone, in the latter case may also be found advantageous in order to reduce further any possibility of premature gelling during storage. In the case of dispersions of copolymers and metal alkoxides in non-aqueous media, however, we have found that the enolizable β-keto compound can often be omitted without sacrificing canstability.

Where the compositions are not stable on storage, it is preferable to store the active components separately and to mix them immediately prior to use. This is generally the case when metal alkyls or alkoxides are used alone as the cross-linking agents in compositions other than non-aqueous dispersions.

As a further embodiment of our invention, we have found that in place of the copolymers used in our compositions there may be used the monomers from which they are derived, together, where necessary, with a suitable polymerization catalyst. This is of course only generally suitable where the vinyl monomer is liquid at normal temperature, e.g., as in the case of vinyl acetate or methyl methacrylate, or is a soluble solid, e.g., as in the case of some polymerizable amides. Thus, in the case of the composition which is heat-hardenable and may be stored at room temperatures, the copolymer may be replaced by the monomers and a polymerization catalyst which is substantially inactive at room temperature, e.g., benzoyl peroxide or laureyl peroxide. Alternatively, where a multi-pack system is used, e.g., for application at room temperature, any combination of the monomers, polymerization catalyst and metal compound may be used so long as the polymerization/catalyst (if active at room temperature) is kept separate from both the monomers. In such cases, the use of a multicomponent catalyst system is often helpful. An example of a suitable combination is (a) a mixture of methyl methacrylate and benzoyl peroxide and (b) a mixture of the chelating monomer, aluminum tri(iso-propoxide), a cobalt salt of an organic acid, e.g., cobalt octanoate or naphthenate, and N,N-dimethyl aniline. The peroxide is inactive at room temperature until contacted with the cobalt salt and the tertiary amine. The polymerizable constituents of (a) and (b) may be reversed, if desired, or alternatively all the polymerizable constituents may be in one or other parts of the combination.

Our compositions may also contain other ingredients, if desired, so long as they do not prevent hardening. Such ingredients may include colorants such as dyes or pigments, heat and ultra-violet stabilizers for the copolymers, accelerators for the hardening reaction, plasticizers, etc. Films and coatings may then be deposited from the compositions, for example by brush-, spray-, weir- or doctor- or air-knife coating, or by dip-coating or any other suitable method as desired, and the products may then be treated as and if necessary to cause cross-linking to yield hard chemically resistant finishes useful in particular for protecting metal and wood. Particular uses of our can-stable compositions, therefore, are as bases for paints.

The invention is now illustrated but in no way limited by the following examples in which all parts are expressed as parts by weight.

EXAMPLES

EXAMPLE 1

Preparation of the acetoacetate of 2-hydroxymethyl-5-norborene

By way of an example of the preparation of the acetoacetate of 2-hydroxymethyl-5norborene, 80 parts of the 2-hydroxymethyl-5-norbornene and 60 parts of diketone were heated together with 0.2 part of triethylamine at 140° C. for 1 hours. No polymerization inhibitor was found necessary. The reaction was slightly exothermic and the resulting solution was closer and orange-red in color. The product was distilled under reduced pressure to give an approximately 80 percent yield of the acetoacetate which boiled at 137°–140° C. at an absolute pressure of 1.9 nn. of mercury.

The ester, a viscous, clear, very pale lime green liquid had the following elemental analysis: C 68.45% (theoretical 69.23%), H 7.70% (theoretical 7.69%) and O 23.13% (theoretical 23.08%).

Infra-red and nuclear magnetic resonance spectra and mass spectrographic data were all consistent with structure I given hereinbefore.

In a second experiment, the 2-hydroxymethyl-5-norbornene and the triethylamine were heated to 65°–70° C. and freshly distilled diketene was then run in over a period of 1 hour while this temperature was maintained. Heating was continued for a further 1 hour and the product was then distilled as described above. An approximately 90 percent yield of acetoacetate was obtained.

Preparation of a copolymer of the acetoacetate of 2-hydroxymethyl-5-norborene.

By way of example of a polymerization in solution, 90 parts of methyl methacrylate, 10 parts of the acetoacetate, 2 parts of azobisisobutyronitrile and 200 parts of toluene were heated at reflux for three hours in air to yield a solution containing 33.1 percent copolymer which on infra-red examination was shown to contain acetoacetate groups.

Hardening with metal compounds

The copolymer solution prepared above was treated with 2 percent of its weight of a 25 percent solution of aluminum tri(isopropoxide) in toluene. The mixture gelled within 5 minutes at room temperature to yield a product insoluble in boiling toluene.

EXAMPLE 2

By way of example of a copolymerization in bulk (i.e., in the absence of solvent or diluent), 90 parts of vinyl acetate, 10 parts of the acetoacetate ester described in Example 1 and 2 parts of azobisisobutyronitrile were heated together at 60° C. for 15 hours in a sealed tube which had been previously purged with nitrogen. The viscous liquid so produced was washed from the tube with toluene to yield a solution containing 85 percent by weight of copolymer which infra-red examination showed to contain acetoacetate groups.

10 parts of a toluene solution containing 2.2 parts of this copolymer were treated with 0.2 part of zirconium tetrakis(acetylacetonate) to give a product in which no noticeable change occurred after storing in a closed vessel at room temperature for more than 15 days. Films cast from this solution, however, hardened at room temperature as the solvent evaporated and the products so obtained could not be redissolved in boiling toluene.

EXAMPLE 3

This is an example of the synthesis of a copolymer of the chelating monomer by copolymerizing 2-hydroxymethyl-5-norborene and thereafter reacting the copolymer with diketone.

90 parts of styrene, 10 parts of 2-hydroxymethyl-5-norborene and 3 parts of azobisisobutyronitrile were heated for 4 hours in air at 110° C. in 300 parts of toluene. 100 parts of the copolymer solution so obtained were then heated to reflux for 1 hour in the presence of 4 parts of diketene and 0.2 part of triethylamine. The resulting yellow-green solution was cooled and the copolymer precipitated into a large excess of methanol, filtered, dried, redissolved in toluene, reprecipitated in methanol and finally dried in vacuum at 50° C. Infra-red examination of the product showed no residual peaks in the spectrum corresponding to hydroxyl groups but a pronounced doublet carbonyl peak was observed at 1,730 $cm^{-1}$ and 1,710 $cm^{-1}$, confirming the presence of acetoacetate groups.

Addition of aluminum tri(isopropoxide) to a toluene solution of the copolymer caused gelatin at room temperature.

EXAMPLE 4

This is an example of preparing and using a non-aqueous dispersion of the copolymer.

Following the general procedure and using the type of stabilizer described in British patent specification 941305, vinyl acetate was copolymerized with the acetoacetate ester of 2-hydroxymethyl-5-norbornene in petroleum ether to yield a stable dispersion of copolymer containing approximately 95 mole percent vinyl acetate.

50 parts of this dispersion, containing 25 parts of the copolymer, were mixed with 7.5 parts of diisobutyl phthalate as plasticizer and 0.8 part of finely ground aluminum tri(isopropoxide), to yield a stable fluid dispersion. Films cast or sprayed from this could be air dried, or heated for 10 minutes at 60° C, to yield cross-linked materials insoluble in boiling toluene.

EXAMPLE 5

To show that the acetoacetate of 2-hydroxymethyl-5-norborene does not cause excessive chain transfer and thus reduce the molecular weight of copolymers into which it is incorporated, a series of copolymers were prepared exactly as described in Example 1 but using varying comonomer ratios. The copolymers were precipitated into methanol, filtered, redissolved in toluene, reprecipitated into methanol, filtered and finally dried in vacuum at 50° C. The viscosities of 1 percent solutions of the copolymers in benzene were measured at 30° C. and are recorded below.

| Composition of Monomer mixture (parts by wt.) | | Reduced Viscosity of a 1% solution |
|---|---|---|
| Methyl methacrylate | Acetoacetate ester | |
| 100 | 0 | 1.19 |
| 95 | 5 | 1.19 |
| 90 | 10 | 1.20 |
| 80 | 20 | 1.15 |

EXAMPLE 6

A 30 percent by weight solution in toluene of a copolymer of methyl methacrylate and the acetoacetate of 2-hydroxymethyl-5-norborene was prepared exactly as described in Example 1 except that only 0.5 part azobisisobutyronitrile was used. To 100 parts of this solution were added 1.6 parts magnesium bis(acetylacetonate). This mixture was still stable and fluid after 3 months storage in a sealed container but films cast from it and stoved for 30 minutes at 160° C. were insoluble in toluene, indicating that they were cross-linked.

EXAMPLE 7

To 100 parts of the polymer solution described in Example 6 were added 1.9 parts of zinc bis(acetylacetonate). The mixture was stable and fluid after 3 months storage in a sealed container but films cast from the mixture could be hardened by stoving for 30 minutes at 260° C.

EXAMPLE 8

The composition of Example 7 was modified by replacing the zinc compound with the same quantity of copper bis(acetylacetonate). The resultant composition had similar properties to that of Example 7.

EXAMPLE 9.

The composition of Example 7 was modified by replacing the zinc compound with 1.65 parts of monoisopropoxy aluminum bis(ethylacetoacetate). This composition was still stable and fluid after 3 months storage in a sealed container but films cast from it became hard on exposure to air at room temperature. Improved results could be obtained by heating at 160° C for 30 minutes.

EXAMPLE 10.

To 100 parts of the copolymer solution described in Example 6 was added 1 part of acetylacetone and then 1 part of aluminum tri(isopropoxide). This mixture was stable after 3 months storage but films cast from the mixture hardened slowly in air at room temperature and became insoluble in toluene. More rapid and complete hardening was obtained by stoving for 30 minutes at 160° C.

EXAMPLE 11.

Two parts of a terpolymer of vinylidene chloride, butyl acrylate and the acetoacetate of 2-hydroxymethyl-5-norbornene (5 mole % acetoacetate), obtained by air-drying an aqueous latex prepared by standard polymerization techniques from a mixture of 80 parts vinylidene chloride and 10 parts each of the other two monomers were dissolved in 10 parts of N-methyl pyrrolidene. To this copolymer solution was added a solution containing 0.16 part aluminum tri(isopropoxide) in one part benzene. Rapid gelation occurred at room temperature yielding a product insoluble in boiling N-methyl pyrrolidene.

EXAMPLE 12

A mixture of 17 parts methyl methacrylate (92.4 mole percent), 3 parts of the acetoacetate of 2-hydroxymethyl-5-norbornene (7.6 mole percent), 1 part aluminum tri(isopropoxide), and 0.5 part benzoyl peroxide were heated on a water bath at 98° C. Gelation occurred in 6 minutes and the product was found to be a cross-linked polymer insoluble in boiling toluene.

EXAMPLE 13

Following the process and using the kind of stabilizer described in British specification 941,305, methyl methacrylate was copolymerized with the acetoacetate of 2-hydroxymethyl-5-norbornene in petroleum ether to yield a stable non-aqueous dispersion of copolymer containing 95 mole percent methyl methacrylate. 25 parts of this dispersion (containing 12.5 parts by weight of copolymer) were mixed with 0.65 part aluminum tris(acetylacetonate) dissolved in 7.5 parts butyl benzyl phthalate and then with 10.2 parts of a dispersion of 70 parts of rutile titanium dioxide in 30 parts of x troleum ether. The resulting pigmented dispersion was still stable after being stored for 5 months at room temperature in a sealed can and films cast or sprayed from it, when stoved at 160° C. for 10 minutes, were glossy and insoluble in toluene.

EXAMPLE 14

Following the process and using the kind of stabilizer described in British specification 941,305, ethyl acrylate, methyl methacrylate and the acetoacetate of 2-hydroxymethyl-5-norborene were copolymerized in petroleum ether to yield a stable, non-aqueous dispersion containing 5 mole % acetoacetate ester and 69 mole percent of ethyl acrylate.

Twenty-five parts of this dispersion, containing 10 parts of terpolymer, were mixed with 0.82 part butyl titanate. Films could be cast or sprayed from this mixture after it had been stored for more than 5 weeks in a sealed container. These were clear, glossy and essentially insoluble in toluene after air-drying for 2 days.

EXAMPLE 15

The following two component system was prepared.
Part A
A mixture of 8.5 parts methyl methacrylate (0.035 mole) and 0.25 part of an aqueous benzoyl peroxide paste containing 80% by weight active material.
Part B
A mixture of 1.5 part (0.007 mole) of the acetoacetate of 2-hydroxymethyl-5-norborene, 0.5 part aluminum tri(isopropoxide), approximately 0.005 part of a 6 percent by weight solution of cobalt naphthenate in aliphatic hydrocarbon and 0.001 part of N,N-dimethyl aniline.

Both A and B were stable provided they were stored separately, but on mixing the solutions the product solidified after about 2 hours to a hard mass which was insoluble in boiling toluene.

EXAMPLE 16

0.9 part of ammonium carbonate and 2.12 parts of sodium lauryl sulphate were dissolved in 134 parts of distilled water and the mixture raised to 90° C. in a flask equipped with stirrer, reflux condenser and thermometer. Over a period of 2 hours were then added simultaneously (a) 0.9 part ammonium persulphate dissolved in 61 parts of distilled water and (b) 21.2 parts of the acetoacetate of 2-hydroxymethyl-5-norbornene and 190 parts of methyl methacrylate while maintaining the temperature at 90° C. Finally, the mixture was heated to 95° C. for a further 30 minutes to complete the polymerization and to yield a stable latex of copolymer containing 95 mole percent methyl methacrylate.

Twenty-five parts of this latex containing 12.5 parts copolymer were mixed with 6 parts of diisobutyl phthalate and 0.5 part aluminum tris(acetylacetonate). Films cast from this mixture, stoved at 160° C. for 10 minutes, were insoluble in toluene.

EXAMPLE 17

6.25 parts of Tergitol N.P. 40 (Registered Trade Mark) were dissolved in 250 parts of distilled water and to this solution were added 31.9 parts of 2-ethylhexyl acrylate, 63.8 parts methyl methacrylate, 10.6 parts of the acetoacetate of 2-hydroxymethyl-5-norborene, 0.125 part of ammonium persulphate and 0.075 part sodium bisulphite. The temperature of the mixture was raised to 65° C. over a period of 30 minutes and maintained at that temperature for a further 10 minutes. After cooling the mixture to 20° C, 35.7 parts of 2-ethylhexyl acrylate, 71.4 parts of methyl methacrylate, 11.9 parts of the acetoacetate, 0.15 part of ammonium persulphate, 0.1 part sodium bisulphate and 8.75 parts of Tergitol N.P. 40 were added and the temperature raised to 65° C, and maintained for a further 2 hours. The mixture was then cooled and its pH adjusted to 9.5 with ammonia to yield a stable terpolymer latex containing approximately 6 mole percent of the acetoacetate.

To 25 parts of this latex containing 12.5 parts of terpolymer were added 5 parts of water containing 2 parts of the reaction product of 1 mole of butyl titanate with 3 moles of triethanolamine. The composition was stored in a sealed container for about 3 weeks without any apparent deterioration. Films were then cast from it and became insoluble in toluene after air drying for 2 days.

EXAMPLE 18

To 10 parts of the polymer solution described in Example 6 was added 1 part of a 20 percent by weight solution of aluminum tri(isobutyl) in toluene. Gelation occurred within a few minutes at room temperature.

What we claim is:
1. The acetoacetate of 2-hydroxymethyl-5-norbornene.

* * * * *